T. G. BASS.
Singletree.

No. 198,265. Patented Dec. 18, 1877.

WITNESSES:
Henry N. Miller
J. W. Scarborough

INVENTOR.
T. G. Bass.
BY Munn & Co
ATTORNEYS.

UNITED STATES PATENT OFFICE.

THOMAS G. BASS, OF PITTSBURG, TEXAS.

IMPROVEMENT IN SINGLE-TREES.

Specification forming part of Letters Patent No. 198,265, dated December 18, 1877; application filed November 6, 1877.

*To all whom it may concern:*

Figure 1:
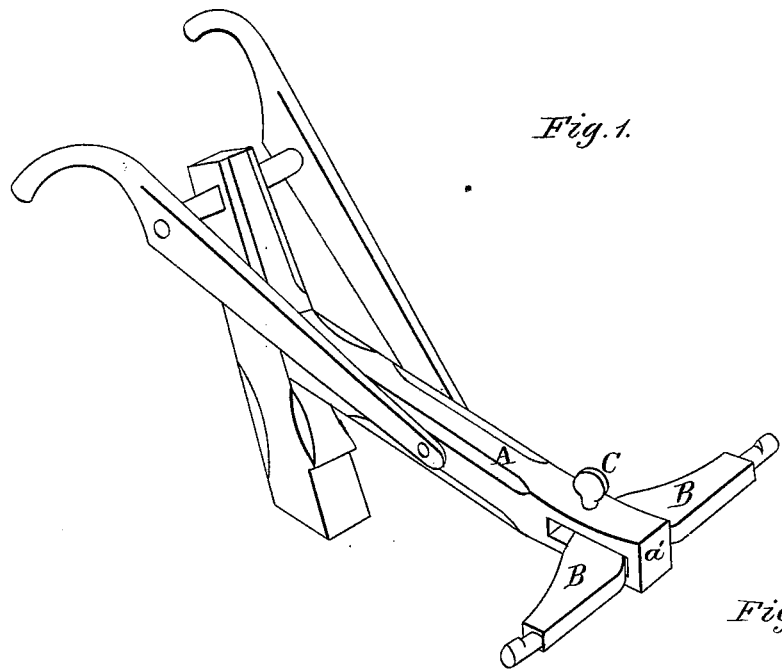
Figure 2:
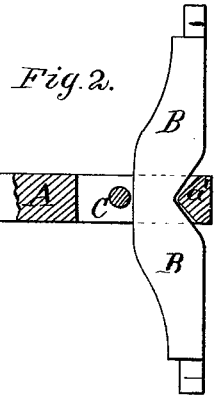
Figure 3:
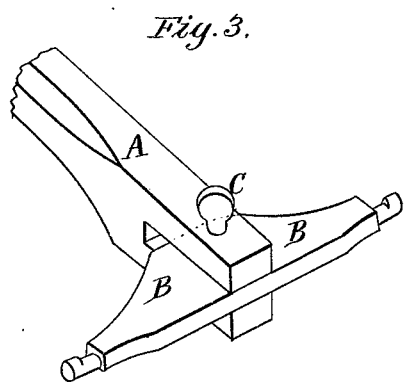

Be it known that I, THOMAS GIBSON BASS, of Pittsburg, in the county of Camp and State of Texas, have invented a new and useful Improvement in Wooden Single-Trees, of which the following is a specification:

Figure 1 is a perspective view of my improved single-tree, shown as applied to a plow-stock. Fig. 2 is a top view of the same, the forward end of the plow-beam being shown in horizontal section. Fig. 3 is a perspective view of a modified form of the same.

Similar letters of reference indicate corresponding parts.

The object of this invention is to furnish an improved single-tree for plows and other similar drafts, which shall be made wholly of wood, shall be simple in construction, inexpensive in manufacture, which shall be without vertical play, and which will prevent the traces from coming off, and from becoming loose or relaxed and falling under the horses' feet.

The invention consists in the single-tree made wide and flat in its middle part, and secured in the mortised or slotted end of the beam by the pin; in the V-shaped block formed in or attached to the mortised or slotted forward end of the beam, in combination with the single-tree having a wider V-shaped notch formed in its forward edge, and with the fastening-pin, as hereinafter fully described.

A represents a plow-beam or other drawbar, in the forward end of which is formed a horizontal mortise or slot, to receive the single-tree B. The single-tree B is made flat and wide horizontally, its middle part being extended to the rearward, and of such a thickness as to fit into the mortise of the beam A, and thus be prevented from having any vertical play.

In the forward edge of the middle part of the single-tree B is formed a V-shaped notch, to receive the V-shaped block $a'$, formed in or attached to the beam B at the forward end of its mortise or slot. The notch in the single-tree B is made wider than the block $a'$, to give the said single-tree the necessary horizontal play.

The single-tree B is kept in place in the mortise or slot of the beam A by a pin, C, which passes down through the forward end of the beam A at the rear edge of the said single-tree B.

In the modification shown in Fig. 3 the block $a'$ and the notch in the forward edge of the single-tree B are omitted, and the pin C passes down through the beam A and the single-tree B, so as to keep the said single-tree in place and sustain the draft.

The ends of the single-tree B are rounded off, and have projections formed upon the upper sides of their ends, to receive the links of the traces, and prevent them from coming off.

The links must be reduced to an oblong form, and are put on by turning their longer axes in line with the longer diameter of the rounded ends of the single-tree, and will never come off until removed by hand.

Having thus described my invention, I claim as new and desire to secure by Letters Patent—

1. The single-tree B, made wide and flat in its middle part, and secured in the mortised or slotted forward end of the beam A by the pin C, substantially as herein shown and described.

2. The V-shaped block $a'$, formed in or attached to the mortised or slotted forward end of the beam A, in combination with the single-tree B, having a wider V-shaped notch formed in its forward edge, and with the pin C, substantially as herein shown and described.

THOMAS GIBSON BASS.

Witnesses:
   W. J. SINGLETARY,
   A. W. CAMPBELL.